(12) United States Patent  
Ponsini

(10) Patent No.: US 8,977,193 B2  
(45) Date of Patent: Mar. 10, 2015

(54) MOBILE STATION INCLUDING A SHORT-RANGE RADIO SECTION AND CORRESPONDING METHOD

(75) Inventor: Nicolas Ponsini, Mougins (FR)

(73) Assignee: Trusted Logic, Meudon (FR)

( * ) Notice: Subject to any disclaimer, the term of this patent is extended or adjusted under 35 U.S.C. 154(b) by 973 days.

(21) Appl. No.: 13/103,633

(22) Filed: May 9, 2011

(65) Prior Publication Data

US 2012/0289152 A1    Nov. 15, 2012

(51) Int. Cl.
*H04B 5/00*    (2006.01)
*H04B 1/38*    (2006.01)
*H04M 1/00*    (2006.01)
*H04W 52/02*    (2009.01)

(52) U.S. Cl.
CPC ...... *H04W 52/0274* (2013.01); *H04M 2250/04* (2013.01)
USPC .......................................... 455/41.1; 455/566

(58) Field of Classification Search
USPC ........ 455/418, 414.1, 41.1, 41.2, 66.1, 550.1, 455/552.1, 553.1, 566
See application file for complete search history.

(56) References Cited

U.S. PATENT DOCUMENTS

| | | | |
|---|---|---|---|
| 2003/0148760 A1* | 8/2003 | Takayanagi | 455/420 |
| 2005/0027443 A1* | 2/2005 | Cato | 701/207 |
| 2009/0067846 A1* | 3/2009 | Yu et al. | 398/128 |
| 2010/0153046 A1* | 6/2010 | Ahluwalia | 702/82 |
| 2012/0069772 A1* | 3/2012 | Byrne et al. | 370/255 |
| 2013/0109311 A1* | 5/2013 | Moosavi | 455/41.1 |

* cited by examiner

*Primary Examiner* — Andrew Wendell
(74) *Attorney, Agent, or Firm* — Buchanan Ingersoll & Rooney PC

(57) ABSTRACT

A mobile station includes a radio section which communicates with a base station, and a short-range radio section for performing short range radio communication independently of the radio section. A backlight mounted on a display portion of the mobile station can be selectively turned on and off. The operation of the short-range radio section is disabled when the backlight is deactivated, and the operation of the short-range radio section is enabled when the backlight is activated.

2 Claims, 1 Drawing Sheet

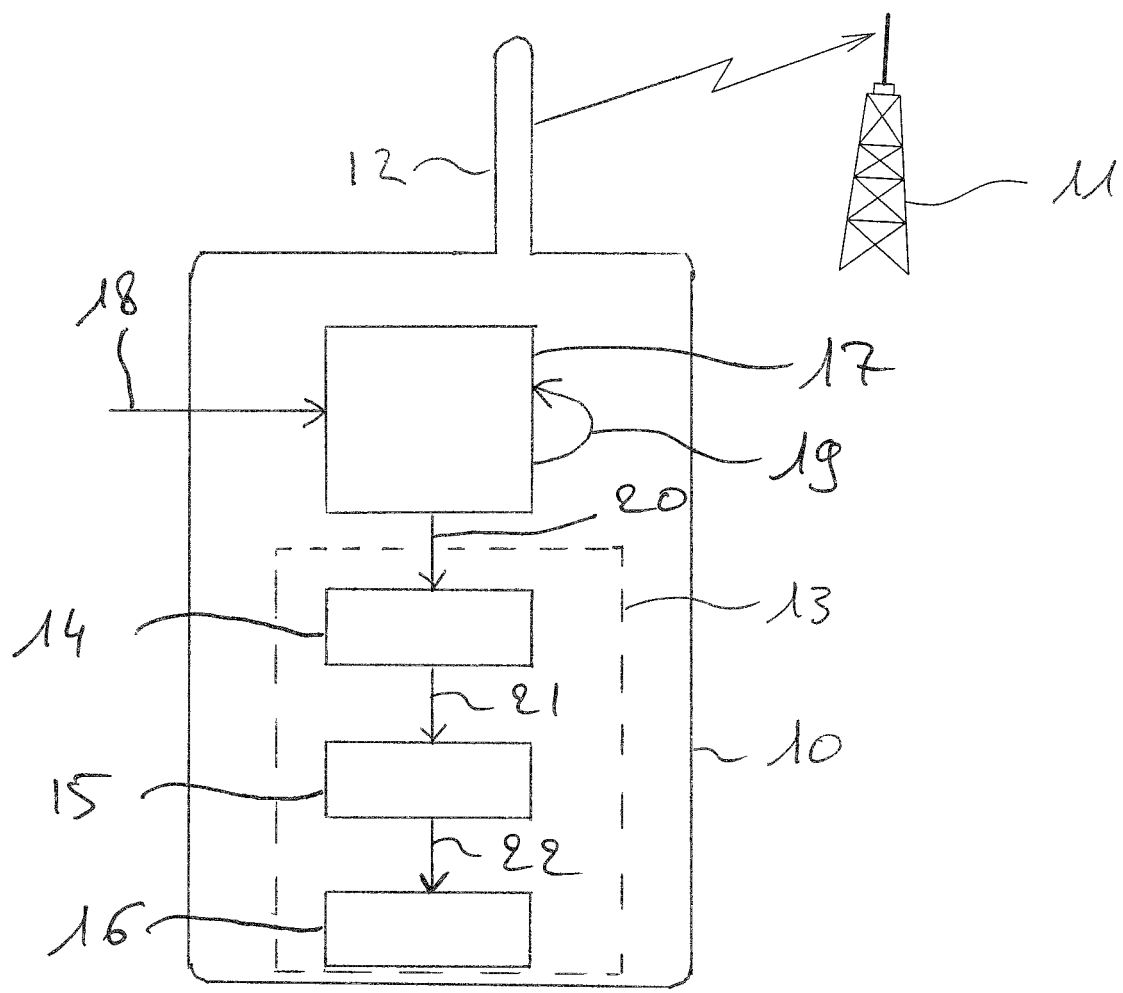

MOBILE STATION INCLUDING A SHORT-RANGE RADIO SECTION AND CORRESPONDING METHOD

BACKGROUND OF THE INVENTION

The invention concerns the telecommunication domain and more precisely a mobile station, such as mobile phone, comprising a radio section which communicates with a base station and a short-range radio section for performing short range radio communication independently of this radio section. The short-range radio section is, for example, an NFC radio section used for communicating with another station, for example a payment terminal. The short-range radio section can also be a Bluetooth radio section.

Mobile terminals can be used for making payments, sending coupons or money to other mobile terminals. The problem with short-range radio communication is that the user of a terminal having such a mobile terminal is not always aware that his mobile terminal is in a short-range communication mode. Often, only a small indication on the screen of the mobile indicates that the short-range radio communication is active. If the user has inadvertently activated the short-range communication on his mobile, some unscrupulous people are able to read information present in the mobile phone without the consent of the user, for example an entry card. There exists also the danger that an unwanted financial transaction can occur if an unscrupulous person brings a reader close to the mobile terminal when the short-range communication is active.

The present invention has the purpose to solve this problem.

SUMMARY OF THE INVENTION

More precisely, one of the purposes of the invention is to ensure that no short-range communication can occur without the consent of the user of a mobile terminal, by using simple means already existing in mobile terminals.

Another purpose of the invention is to reduce power consumption of the mobile terminal, since short-range radio communications are frequently very power consuming.

According to the invention, this purpose is achieved by using the backlight of the mobile terminal. Means are provided for turning on and off the backlight of the display portion of the mobile terminal. Control means disable the operation of the short-range radio section when the backlight is deactivated, and enable the operation of the short-range radio section when this backlight is activated.

Using the backlight of the screen of the mobile terminal for indicating if the short-range communication is active is a powerful visual indicator for the user: After having been turned on, the backlight is generally automatically turned off after approximately 10 seconds. This time frame is sufficient for executing a transaction, for instance a financial transaction (a tap on an NFC reader for example).

The backlight of the screen of a mobile terminal is generally turned on by the user after having pushed, in a time frame of 2 or 3 seconds, successively two buttons of the mobile terminal when the latter is in standby mode. This operation also unlocks the keypad of the terminal. After approximately 10 seconds, the backlight turns off.

Preferably, the invention applies to a short-range radio section working in an NFC mode.

The invention also concerns a method for enabling the operation of a short-range radio section of a mobile station comprising a radio section which communicates with a base station, the short-range radio section performing short-range radio communication independently of the radio section, the mobile station comprising a backlight mounted on a display portion of the mobile station. This method includes:
  disabling the operation of the short-range radio section when the backlight is deactivated;
  enabling the operation of the short-range radio section when the backlight is activated.

BRIEF DESCRIPTION OF THE DRAWING

Other features of the present invention will now be described in reference to the accompanying drawing that shows a mobile terminal according to the present invention.

DETAILED DESCRIPTION

In the SOLE FIGURE, a mobile station 10 includes a non represented radio section which communicates with a base station 11 through an antenna 12. The mobile station 10 also comprises a short-range radio section 13 for performing short range-radio communication independently of the radio section, for example an NFC or Bluetooth communication. The short-range radio section 13 comprises a short-range system application 14, for example an NFC system application, a short-range physical bus driver 15, and a short-range chip 16. The mobile station 10 also comprises an operating system 17 comprising a power management system used for managing the backlight of the screen of the mobile station 10. The backlight can be set on and off through user interaction 18, for example by pressing one button or successively and rapidly two buttons of the keypad of the terminal 10, or through a power saving agent 19. The power saving agent 19 is able to turn off the backlight of the mobile station 10. It comprises for example a timer for turning off the backlight after a predetermined period of time, for example after 10 seconds.

According to the invention, the operating system 17 comprises means for disabling the operation of the short-range radio section 13 when the backlight is deactivated (off state) and for enabling the operation of the short-range radio section 13 when the backlight is activated (on state). This can be performed by informing the system application 14 (by a signal 20) that the backlight is on (or off). The system application 14 then enables or disables (by a signal 21) the driver 15 of the short-range radio section 13. The latter powers on or off the short-range chip 16 (by a signal 22) in order to set on or off the short-range radio function (for example the NFC function).

The invention also concerns a method for enabling the operation of a short-range radio section 13 of a mobile station 10 comprising a radio section which communicates with a base station 11. The short-range radio section 13 is designed for performing short-range radio communication independently of the radio section. The mobile station 10 comprises a backlight mounted on a display portion of the mobile station 10 and the method includes:
  disabling the operation of the short-range radio section 13 when the backlight is deactivated;
  enabling the operation of the short-range radio section 13 when the backlight is activated.

The invention ensures that no short-range communication can occur without the consent of the user of a mobile terminal, by using the backlight mechanism of the mobile terminal. The invention also reduces the power consumption of a mobile terminal since NFC transactions and detection of peers are very power consuming. Automatically turning off the NFC functionality of the terminal when no backlight is active saves power consumption.

The invention claimed is:

1. A mobile station comprising:
a radio section which communicates with a base station;
an NFC short-range radio section for performing short range radio communication independently of said radio section, wherein said NFC short-range radio section operates in a near field communication mode;
means for turning on and off a backlight mounted on a display portion of said mobile station, wherein said means for turning off said backlight comprise a timer for turning off said backlight after a predetermined period of time, and at least two buttons that can be activated by a user of said mobile station, wherein said means for turning on and off said backlight are configured to turn off said backlight in response to a user successively and rapidly pressing said two buttons; and
control means for disabling the operation of said NFC short-range radio section in response to said backlight being deactivated and for enabling the operation of said NFC short-range radio section in response to said backlight being activated.

2. A method for enabling the operation of an NFC short-range radio section of a mobile station comprising a radio section which communicates with a base station, said NFC short-range radio section performing short-range radio communication independently of said radio section, wherein said NFC short-range radio section operates in a near field communication mode, said mobile station further comprising a backlight mounted on a display portion of said mobile station, said method comprising the following steps:
turning off said backlight if a predetermined period of time lapses;
turning off said backlight if a user presses at least two buttons in succession;
disabling the operation of said NFC short-range radio section in response to said backlight being deactivated, wherein said backlight is deactivated in response to a user successively and rapidly pressing two buttons; and
enabling the operation of said NFC short-range radio section in response to said backlight being activated.

* * * * *